United States Patent
Roedfalk

(12) 
(10) Patent No.: US 10,768,036 B2
(45) Date of Patent: Sep. 8, 2020

(54) METHOD FOR DETECTING A LEVEL OF A MELT, METHOD FOR DETECTING A THICKNESS OF A CASTING POWDER, DETECTOR AND DETECTOR SYSTEM

(71) Applicant: Berthold Technologies GmbH & Co. KG, Bad Wildbad (DE)

(72) Inventor: Albert Roedfalk, Dalby (SE)

(73) Assignee: Berthold Technologies GmbH & Co. KG, Bad Wildbad (DE)

( * ) Notice: Subject to any disclaimer, the term of this patent is extended or adjusted under 35 U.S.C. 154(b) by 0 days.

(21) Appl. No.: 16/389,068

(22) Filed: Apr. 19, 2019

(65) Prior Publication Data

US 2019/0323877 A1   Oct. 24, 2019

(30) Foreign Application Priority Data

Apr. 23, 2018   (EP) .................................... 18168729

(51) Int. Cl.
| | |
|---|---|
| *G01F 23/288* | (2006.01) |
| *B22D 11/18* | (2006.01) |
| *B22D 2/00* | (2006.01) |
| *B22D 11/16* | (2006.01) |

(52) U.S. Cl.
CPC ......... *G01F 23/2885* (2013.01); *B22D 2/003* (2013.01); *B22D 11/166* (2013.01); *B22D 11/185* (2013.01); *G01F 23/288* (2013.01)

(58) Field of Classification Search
CPC . G01F 23/288; G01F 23/2885; B22D 11/166; B22D 11/185; B22D 2/003
See application file for complete search history.

(56) References Cited

U.S. PATENT DOCUMENTS 6,024,161 A * 2/2000 Fujioka ................ B22D 11/043
164/413

FOREIGN PATENT DOCUMENTS

| CN | 1071753 A | 5/1993 |
| EP | 0 859 223 A1 | 8/1998 |
| GB | 1086276 A | 8/1965 |

* cited by examiner

*Primary Examiner* — Paul M. West
(74) *Attorney, Agent, or Firm* — Crowell & Moring LLP

(57) ABSTRACT

A method detects a level of a melt contained by an oscillating mold. The method includes a) sensing radiation interacted with the melt and generating from the sensed radiation radiation signals, such that the generated radiation signals are varied by the mold oscillation, b) determining a radiation signal variation of the generated radiation signals, c) determining an oscillation deflection variation of the oscillating mold, and d) determining from the determined oscillation deflection variation and the determined radiation signal variation, the level of the melt.

18 Claims, 2 Drawing Sheets

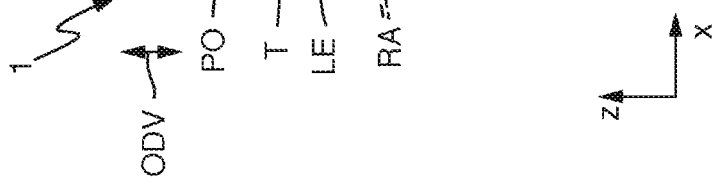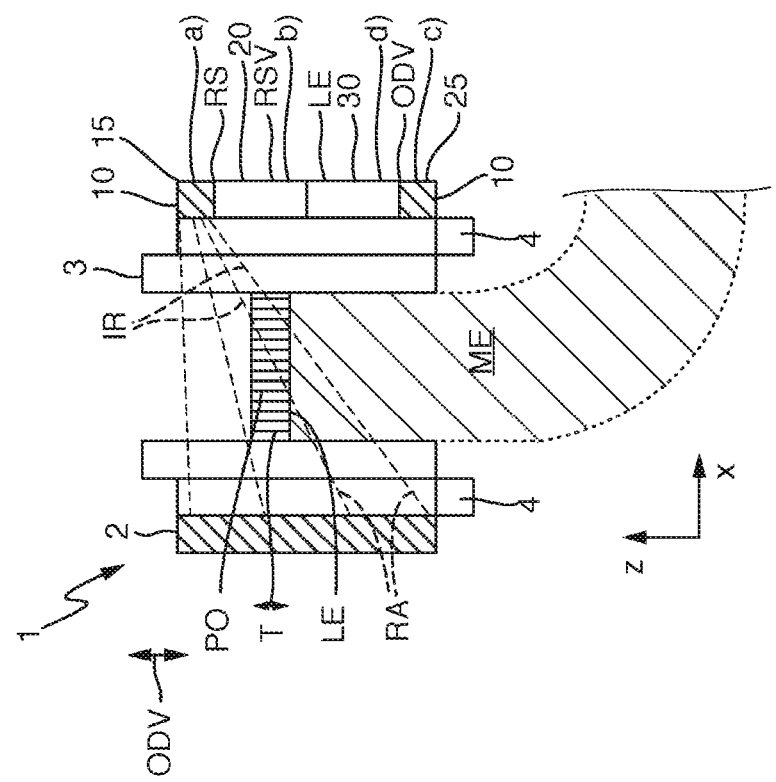

METHOD FOR DETECTING A LEVEL OF A MELT, METHOD FOR DETECTING A THICKNESS OF A CASTING POWDER, DETECTOR AND DETECTOR SYSTEM

CROSS REFERENCE TO RELATED APPLICATION

This application claims priority under 35 U.S.C. § 119 from European Patent Application No. 18168729.4, filed Apr. 23, 2018, the entire disclosure of which is herein expressly incorporated by reference.

BACKGROUND AND SUMMARY OF THE INVENTION

The invention relates to a method for detecting a level of a melt contained by an oscillating mold, a method for detecting a thickness of a casting powder on a melt contained by an oscillating mold comprising such a method, a detector for detecting a level of a melt contained by an oscillating mold and a detector system comprising such a detector.

It is the object of the invention to provide a method for detecting a level of a melt contained by an oscillating mold in an improved manner than in the prior art. It is a further object of the invention to provide a method for detecting a thickness of a casting powder on a melt contained by an oscillating mold comprising such a method, a detector for detecting a level of a melt contained by an oscillating mold and a detector system comprising such a detector.

The invention relates to a method for detecting, in particular automatically detecting, a level, in particular a value of the level, or a fill, respectively, of a melt contained by an oscillating mold. The inventive method comprises the steps: a) sensing, in particular automatically sensing, radiation interacted with the melt and generating, in particular automatically generating, or converting, respectively, from the sensed radiation radiation signals, in particular radiation signal values, such that the generated radiation signals are varied by the mold oscillation; b) determining, in particular automatically determining, or calculating, respectively, a radiation signal variation, in particular a value of the radiation signal variation, of the generated radiation signals; c) determining, in particular automatically determining, or sensing and/or calculating, respectively, an oscillation deflection variation, in particular a value of the oscillation deflection variation, of the oscillating mold; and d) determining, in particular automatically determining, or calculating, respectively, from the determined oscillation deflection variation and the determined radiation signal variation the level, in particular the level value, of the melt.

The method enables to detect the level of the melt contact-free or contactless or without contact, respectively. In particular detecting may be denoted as measuring.

Furthermore the method enables an increased accuracy of the level, in particular for or during or in, respectively, continuous casting or strand casting, respectively, in particular being more robust against a disturbance.

Moreover, the method enables to feed or to supply, in particular more or new, melt, in particular into the mold, in dependence of or as a function of or based on the detected or determined level of the melt.

In particular the melt may comprise or be a molten metal, in particular steel.

The mold may be denoted as coquille. Further, the mold may be adapted to contain the melt. The level of the melt may be a level, in particular of a surface of the melt, with respect to the mold, in particular a top or a bottom of the mold, and/or may be changeable along a vertical direction. A height or a depth of the mold may be in a range from 0.5 to 2 meters (m). The level of the melt may be in a range from zero to the height of the mold, in particular from 0.05 m to 0.25 m below the top of the mold. Furthermore, the mold may comprise or have an opening at a bottom, lower or base end, in particular for exiting of the melt or the metal or a strand, respectively. In other words: the mold may be denoted as open-base mold. Moreover, the oscillating mold or the oscillation of the mold or the mold oscillation, respectively, may enable to prevent sticking of the melt or the metal or the strand, respectively, to a wall, in particular to a side wall, of the mold. Regarding further details reference is made to the corresponding technical literature.

Until now the variation of the generated radiation signals by the mold oscillation has been considered as noise of the generated radiation signals. Therefore, until now the generated radiation signals have been cleaned from the "oscillation noise".

In contrast, the present invention is based on the finding that the variation of the generated radiation signals contains information. This information or the radiation signal variation, respectively, can be used, in particular in combination with the oscillation deflection variation, for the detecting of the level of the melt.

In particular the radiation signal variation may be in the form of a radiation signal variation amplitude, in particular a value of the radiation signal variation amplitude. Additionally or alternatively the radiation signal variation may be in the form of a difference, in particular a value of the difference, of extreme radiation signals, in particular values of the extreme radiation signals, of the generated radiation signals. In particular the extreme radiation signals may comprise a minimal radiation signal, in particular a value of the minimal radiation signal, and a maximal radiation signal, in particular a value of the maximal radiation signal. Additionally or alternatively the radiation signal variation may be in the form of the extreme radiation signals, in particular the values of the extreme radiation signals. Additionally or alternatively the radiation signal variation may be in the form of a mean radiation signal, in particular a value of the mean radiation signal, of the generated radiation signals plus/minus half the radiation signal variation amplitude, in particular half the value of the radiation signal variation amplitude.

The oscillation deflection variation may be in the form of an oscillation deflection variation amplitude, in particular a value of the oscillation deflection variation amplitude. In particular the oscillation deflection variation may be denoted as oscillation amplitude. Additionally or alternatively the oscillation deflection variation may be in the form of a difference, in particular a value of the difference, of extreme oscillation deflections, in particular values of the extreme oscillation deflections. Additionally or alternatively the oscillation deflection variation may be in the form of the extreme oscillation deflections, in particular the values of the extreme oscillation deflections.

The, in particular detected or determined, level, in particular level value, of the melt may be a mean level, in particular a mean level value.

In particular step b) may be performed simultaneously with step a) and/or after step a). Step c) may be performed before step/s a) and/or b), simultaneously with step/s a) and/or b) and/or after step/s a) and/or b). Step d) may be performed simultaneously with step/s b) and/or c) and/or after step/s b) and/or c). In particular the method may be repeated, in particular several times, or performed continuously, respectively.

In detail step a) and/or step c) may be performed, in particular the sensing and/or the generating of a, in particular single, radiation signal of step a) and/or the determining of a, in particular single, oscillation deflection of step c) may be repeated, such that an, in particular single, oscillation of the mold may be time-resolved. Formulated differently: realtime sampling may be performed. In particular the oscillation deflection may be assigned to the radiation signal. In other words: the sensing and/or the generating of the, in particular single, radiation signal of step a) and/or the determining of the, in particular single, oscillation deflection may be repeated or have a repetition rate, respectively, in the millisecond (ms) range, in particular every 50 ms maximal, in particular every 20 ms maximal, in particular every 10 ms maximal, in particular every 5 ms maximal, and/or in particular every 0.001 ms minimal, in particular every 0.01 ms minimal, in particular every 0.1 ms minimal, in particular every 1 ms minimal, in particular every 2 ms minimal.

Furthermore, the method may comprise the step: outputting, in particular automatically outputting, the detected or determined level of the melt.

According to an embodiment of the invention the mold is oscillated along an oscillation direction, in particular only, perpendicular to the level or the surface of the melt, such that the level or the surface of the melt is varied with respect to the mold or the mold is varied with respect to the level or the surface of the melt, respectively. In particular the mold may be oscillated vertically.

According to an embodiment of the invention the method comprises the step: oscillating, in particular automatically oscillating, the mold. In particular the oscillation of the mold may have a, in particular constant, oscillation amplitude, in particular a value of the oscillation amplitude. In detail the oscillation amplitude may be in a range from 1 millimeter (mm) to 20 mm, in particular from 2 mm to 10 mm, in particular 5 mm, in particular peak-to-peak. Additionally or alternatively the oscillation of the mold may be periodic, in particular harmonic. Formulated differently: the oscillation of the mold may have a, in particular constant, oscillation frequency, in particular a value of the frequency. In detail the oscillation frequency may be in a range from 0.5 Hertz (Hz) to 50 Hz, in particular from 1 Hz to 20 Hz, in particular from 2 Hz to 10 Hz, in particular 5 Hz. In particular the oscillation deflection variation may be known from the oscillating.

According to an embodiment of the invention the method comprises the step: exposing, in particular automatically exposing, the melt to radiation, such that the radiation interacts with the melt. In particular the step exposing may be performed before step a) and/or simultaneously with step a). In particular the step exposing may be repeated, in particular several times, or performed continuously, respectively.

According to an embodiment of the invention the radiation is electromagnetic radiation.

In particular the electromagnetic radiation may be exposed along an exposing direction, in particular only, perpendicular to the level or the surface of the melt, in particular from above. In other words: the exposing direction may be parallel to the oscillation direction. In particular the exposing direction may be vertical. The, in particular exposed, electromagnetic radiation may penetrate into the melt. As a result eddy currents may be induced in a top layer of the melt or the metal, respectively. Theses eddy currents in turn may generate a counteracting electromagnetic field or the interacted, in particular electromagnetic, radiation, respectively. In particular the, in particular interacted, electromagnetic radiation may be sensed along a radiation direction, in particular only, perpendicular to the level or the surface of the melt, at above. In other words: the radiation direction may be parallel to the oscillation direction. In particular the radiation direction may be vertical. A strength of the electromagnetic field or the interacted radiation, respectively, may be proportional to a distance between a radiation source and/or a radiation sensing and radiation signal generating device and the melt or the metal, respectively. In particular the generated radiation signals, respectively, may be vectors, in particular being two-dimensional or having two components, respectively, in particular amplitude in phase and paraphase. In this way the level of the melt may be detected. Regarding further details reference is made to the corresponding technical literature.

According to an embodiment of the invention the radiation is gamma radiation. In particular the gamma radiation may be exposed along an exposing direction, in particular only, parallel to the level or the surface of the melt, in particular from one side of the mold. In other words: the exposing direction may be perpendicular to the oscillation direction. In particular the exposing direction may be horizontal. The, in particular exposed, gamma radiation may be attenuated or absorbed as it passes through or transmits the melt and/or the mold, respectively. This attenuation or the, in particular interacted, gamma radiation may be sensed, in particular at or on another side of the mold, in particular being opposite to the one side. An extent to which the gamma radiation may be attenuated may depend on the melt level. The higher the level of the melt or the metal, respectively, in particular in the mold, the less gamma radiation may reach the another side and/or be sensed, respectively. In particular the generated radiation signals, respectively, may be a count rate, in particular having a unit of counts per second (cps). In this manner the level of the melt may be detected. Regarding further details reference is made to the corresponding technical literature.

According to an embodiment of the invention in step a) the, in particular interacted and/or gamma, radiation is sensed along a radiation direction, in particular only, parallel to the level or the surface of the melt, in particular at or on another side of the mold. In other words: the radiation direction may be perpendicular to the oscillation direction. In particular the radiation direction may be horizontal.

According to an embodiment of the invention the mold is oscillated with a, in particular the, frequency. In step b) the radiation signal variation is determined, in particular automatically determined, by frequency analysis of the generated radiation signals. In particular the frequency analysis may comprise or be a fast Fourier transform (FFT). Additionally or alternatively in step c) the oscillation deflection variation may be determined, in particular automatically determined, by frequency analysis. In particular the frequency may be determined by the frequency analysis for the oscillation deflection variation. Afterwards the generated radiation signals may be frequency analyzed and an amplitude, in particular a value of the amplitude, at the before determined frequency may be used as the radiation signal variation.

According to an embodiment of the invention step d) comprises: determining, in particular automatically determining, a, in particular local, slope, in particular a value of the slope, or gradient, respectively, from the determined oscillation deflection variation over the determined radiation signal variation. Determining, in particular automatically determining, from the determined slope the level of the melt. In particular the slope may be decreasing.

According to an embodiment of the invention step d) comprises: selecting, in particular automatically selecting, a, in particular local, calibration slope, which fits or matches best or is closest or next to the determined slope, of at least one calibration curve. In the calibration curve different calibration levels are assigned to different, in particular local, calibration slopes. Selecting, in particular automatically selecting, the calibration level, which is assigned to the selected calibration slope, as the level of the melt. In particular the present invention is based on the finding, that the calibration curve is nonlinear and that a, in particular local, part of the curve is, in particular periodically, traversed, in particular by the generated radiation signals varied by the mold oscillation. The calibration curve may be detected or measured, respectively, in particular by a calibration rig. Additionally or alternatively the calibration curve may be calculated. In particular the calibration curve may be stored in a look-up table.

According to an embodiment of the invention the method comprises the step: determining, in particular automatically determining, in particular the, extreme radiation signals and/or a, in particular the, mean radiation signal of the generated radiation signals. In step d) the level of the melt is determined, in particular automatically determined, from the determined radiation signal variation at or for the determined extreme radiation signals and/or at or for the determined mean radiation signal. In particular several, in particular different, calibration curves with the, in particular local, calibration slope, which fits best the determined slope, may be present or available or existing, respectively, but with the best fitting calibration slope, respectively, at different extreme radiation signals and/or at different mean radiation signals. In detail step d) may comprise: selecting at the determined extreme radiation signals and/or at the determined mean radiation signal the calibration slope, which fits best the determined slope, of the several calibration curves. In the calibration curves, respectively, at different extreme radiation signals and/or at different mean radiation signals, respectively, different calibration levels may be assigned to different calibration slopes. Selecting the calibration level, which is assigned to the selected calibration slope of the selected calibration curve, as the level of the melt. Additionally or alternatively step d) may comprise: selecting the calibration slope/s, which fit/s best the determined slope, of the several calibration curve. In the calibration curves, respectively, different calibration levels may be assigned to different calibration slopes at different extreme radiation signals and/or at different mean radiation signals, respectively. Selecting the best fitting calibration slope, which fits best or is at the determined extreme radiation signals and/or at the determined mean radiation signal. Selecting the calibration level, which is assigned to the selected calibration slope of the selected calibration curve, as the level of the melt.

In particular the several calibration curves may be present due to a disturbance, in particular due to different values of the disturbance. In particular in the case or for the electromagnetic radiation a, in particular respective, temperature of the melt and/or the mold may be the disturbance. In the case or for the gamma radiation a casting powder, in particular a thickness of the casting powder, on the melt may be the disturbance.

The invention further relates to a method for detecting, in particular automatically detecting a thickness, in particular a value of the thickness, of a, in particular the, casting powder, in particular floating, on a, in particular the, melt contained by an, in particular the, oscillating mold. The inventive method comprises: a method as described above and the step: determining, in particular automatically determining, or calculating, respectively, from the determined oscillation deflection variation and the determined radiation signal variation the thickness of the casting powder.

The method enables to detect the thickness of the casting powder contact-free or contactless or without contact, respectively. In particular detecting may be denoted as measuring.

Furthermore the method enables to feed or to supply, in particular more or new, casting powder, in particular to or into the melt, in dependence of or as a function of or based on the detected or determined thickness of the casting powder.

In particular to the, in particular different, calibration curves different calibration thicknesses may be assigned. The step determining the thickness of the casting powder may comprise: selecting, in particular automatically selecting, the calibration thickness, which is assigned to the selected calibration curve, as the thickness of the casting powder.

The casting powder thickness may be in a range from zero to 100 mm, in particular from 10 mm to 50 mm, in particular 30 mm. In particular the thickness may be along a vertical direction. Additionally or alternatively the calibration thicknesses may differ by 5 mm to 20 mm, in particular by 10 mm.

The casting powder may be, in particular added, on the metal. The casting powder may enable to prevent sticking of the melt or the metal, respectively, to the wall of the mold. Additionally or alternatively the casting powder may enable to trap any slag particles, that may be present in the melt or the metal, respectively, and to bring them to a top or the surface, respectively, of the melt, in particular to form a floating layer of slag. Additionally or alternatively the casting powder may enable to prevent oxidation of the melt or the metal, respectively, in particular with ambient air. Regarding further details reference is made to the corresponding technical literature.

The, in particular sensed, radiation may have interacted with the casting powder, if present.

Furthermore, the method may comprise the step: outputting, in particular automatically outputting, the detected or determined thickness of the casting powder.

The invention further relates to a detector for detecting a level of a melt contained by an oscillating mold. The inventive detector comprises: a radiation sensing and radiation signal generating device, a radiation signal variation determining device, an oscillation deflection variation determining device and a level determining device. The radiation sensing and radiation signal generating device is adapted to sense radiation interacted with the melt and to generate from the sensed radiation radiation signals, such that the generated radiation signals are varied by the mold oscillation. The radiation signal variation determining device is adapted to determine a radiation signal variation of the generated radiation signals. The oscillation deflection variation determining device is adapted to determine an oscillation deflection variation of the oscillating mold. The level determining device is adapted to determine from the determined oscillation deflection variation and the determined radiation signal variation the level of the melt.

In particular the detector may be adapted to perform a method as described above. By means of the method according to the invention, the advantages of the method according to the invention, as discussed above, may be made applicable for the detector.

The detector may be denoted as melt level detector. Additionally the detector may be denoted as casting powder thickness detector.

The radiation sensing and radiation signal generating device may be an electric radiation sensing and radiation signal generating device. In particular the radiation sensing and radiation signal generating device may comprise or be at least one electromagnetic coil, in particular for sensing electromagnetic radiation. Regarding further details reference is made to the corresponding technical literature. Additionally or alternatively the radiation sensing and radiation signal generating device may comprise or be at least one scintillator and/or at least one photosensor or optoelectronic sensor, in particular for sensing gamma radiation. Regarding further details reference is made to the corresponding technical literature.

The radiation signal variation determining device may be an electric radiation signal variation determining device. In particular the radiation signal variation determining device may comprise or be a processor, in particular a microprocessor, and/or a storage, in particular a memory.

The oscillation deflection variation determining device may be an electric oscillation deflection variation determining device. In particular the oscillation deflection variation determining device may comprise or be a processor, in particular a microprocessor, and/or a storage, in particular a memory.

The level determining device may be an electric level determining device. In particular the level determining device may comprise or be a processor, in particular a microprocessor, and/or a storage, in particular a memory. Additionally or alternatively the level determining device may be adapted to determine from the determined oscillation deflection variation and the determined radiation signal variation the thickness of the casting powder. The level determining device may be denoted as thickness determining device.

Moreover, the radiation sensing and radiation signal generating device and/or the oscillation deflection variation determining device may be adapted to be arranged with respect to the mold, in particular to be attached to the mold, such that the radiation sensing and radiation signal generating device and/or the oscillation deflection variation determining device may be oscillating or oscillated, in particular together, with the mold. In other words: the radiation sensing and radiation signal generating device and/or the oscillation deflection variation determining device may be adapted to be arranged with respect to the melt, in particular its level or surface, such that the level or the surface of the melt may be varied with respect to the radiation sensing and radiation signal generating device and/or the oscillation deflection variation determining device or the radiation sensing and radiation signal generating device and/or the oscillation deflection variation determining device may be varied with respect to the level or the surface of the melt.

In particular the at least one electromagnetic coil, if present, may be arranged at a top end of or above the mold and/or the melt. Additionally or alternatively the at least one scintillator and/or the at least one photosensor, if present, may be arranged at the another side or side wall of the mold, in particular at an outside.

Further, the detector may comprise an, in particular electric, output. The output may be adapted to output the detected or determined level of the melt and/or the detected or determined thickness of the casting powder.

Furthermore, the radiation sensing and radiation signal generating device may be operatively connected to or comprise a, in particular electric, signal connection with the radiation signal variation determining device. Additionally or alternatively the radiation signal variation determining device may be operatively connected to or comprise a, in particular electric, signal connection with the level determining device. Additionally or alternatively the oscillation deflection variation determining device may be operatively connected to or comprise a, in particular electric, signal connection with the level determining device. Additionally or alternatively the level determining device may be operatively connected to or comprise a, in particular electric, signal connection with the output, if present.

According to an embodiment of the invention the oscillation deflection variation determining device comprises an, in particular electric, inertial sensor and/or an, in particular electric, accelerometer. The inertial sensor and/or the accelerometer are/is adapted to determine the oscillation deflection variation of the oscillating mold.

The invention further relates to a detector system. The inventive detector system comprises a detector as described above and a radiation source. The radiation source is adapted to expose the melt to radiation, such that the radiation interacts with the melt.

In particular the detector system may be adapted to perform a method as described above. By means of the method according to the invention, the advantages of the method according to the invention, as discussed above, may be made applicable for the detector system.

Furthermore, by means of the detector according to the invention, the advantages of the detector according to the invention, as discussed above, may be made applicable for the detector system.

In particular the radiation source may be, in particular the, at least one electromagnetic coil. Additionally or alternatively the radiation source may be a gamma radiation source.

Additionally or alternatively the radiation source may be adapted to be arranged with respect to the mold, in particular to be attached to the mold, such that the radiation source may be oscillating or oscillated, in particular together, with the mold. In other words: the radiation source may be adapted to be arranged with respect to the melt, in particular its level or surface, such that the level or the surface of the melt may be varied with respect to the radiation source or the radiation source may be varied with respect to the level or the surface of the melt.

In particular the at least one electromagnetic coil, if present, may be arranged at a top end of or above the mold and/or the melt. Additionally or alternatively the gamma radiation source, if present, may be arranged at the one side or side wall of the mold, in particular at an outside.

The invention further relates to a detector system. The inventive detector system comprises a detector as described above. Additionally the detector system comprises the mold and/or an, in particular electric, oscillating device. The oscillating device is adapted to oscillate the mold.

In particular the detector system may be adapted to perform a method as described above. By means of the method according to the invention, the advantages of the method according to the invention, as discussed above, may be made applicable for the detector system.

Furthermore, by means of the detector according to the invention, the advantages of the detector according to the invention, as discussed above, may be made applicable for the detector system.

Moreover, the detector system may comprise a, in particular the, radiation source, in particular as described above.

In particular the mold may be partially or completely adapted or embodied as described above.

The oscillating device may be operatively connected to or comprise a, in particular electric, signal connection with the oscillation deflection variation determining device. In particular the oscillating device may comprise the oscillation deflection variation determining device.

In the following, an embodiment of the invention will be described in detail with reference to the drawings. Throughout the drawings, the same elements will be denoted by the same reference numerals.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 schematically shows a method for detecting a level of a melt contained by an oscillating mold and a method for detecting a thickness of a casting powder on the melt according to an embodiment of the invention and a detector system according to an embodiment of the invention comprising a detector, wherein the mold is in a lower or bottom peak deflection.

FIG. 2 schematically shows the methods, the detector system and the detector of FIG. 1, wherein the mold is in an upper or top peak deflection.

DETAILED DESCRIPTION OF THE DRAWINGS

FIGS. 1 and 2 show an exemplary inventive detector system 1. The detector system 1 comprises a detector 10.

Figure 3:
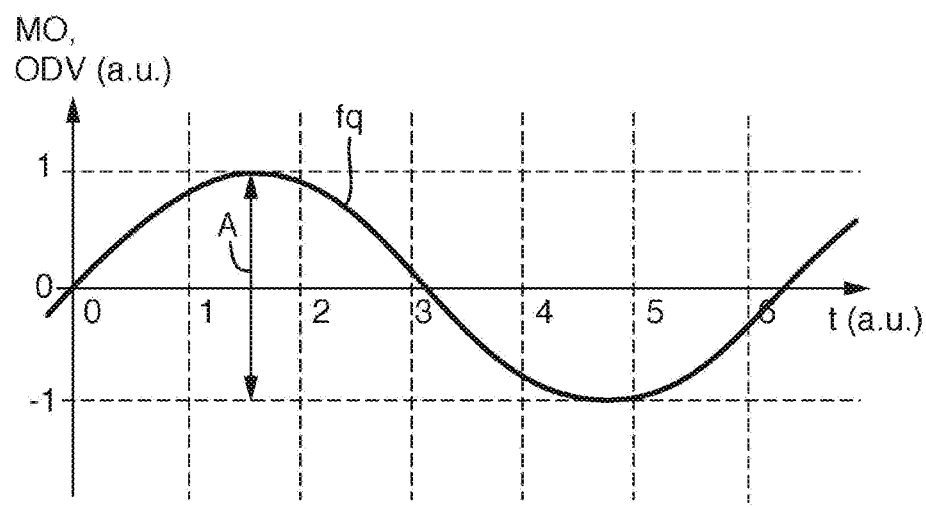
FIG. 3 schematically shows a diagram of an oscillation deflection variation over time of the oscillating mold of FIG. 1.

The detector 10 is adapted to detect a level LE of a melt ME contained by an oscillating mold 3. The detector 10 comprises: a radiation sensing and radiation signal generating device 15, a radiation signal variation determining device 20, an oscillation deflection variation determining device 25 and a level determining device 30. The radiation sensing and radiation signal generating device 15 is adapted to sense radiation IR, as shown by dashed lines in FIGS. 1 and 2, interacted with the melt ME and to generate from the sensed radiation IR radiation signals RS, such that the generated radiation signals RS are varied by the mold oscillation MO. In the shown embodiment the radiation sensing and radiation signal generating device 15 senses radiation IR interacted with the melt ME and generates from the sensed radiation IR radiation signals RS and the generated radiation signals RS are varied by the mold oscillation MO. The radiation signal variation determining device 20 is adapted to determine a radiation signal variation RSV of the generated radiation signals RS. In the shown embodiment the radiation signal variation determining device 20 determines the radiation signal variation RSV of the generated radiation signals RS. The oscillation deflection variation determining device 25 is adapted to determine an oscillation deflection variation ODV of the oscillating mold 3. In the shown embodiment the oscillation deflection variation determining device 25 determines the oscillation deflection variation ODV of the oscillating mold 3, as shown in FIG. 3. The level determining device 30 is adapted to determine from the determined oscillation deflection variation ODV and the determined radiation signal variation RSV the level LE of the melt ME. In the shown embodiment the level determining device 30 determines from the determined oscillation deflection variation ODV and the determined radiation signal variation RSV the level LE of the melt ME, as shown in FIG. 4.

Furthermore, FIGS. 1 to 4 show an inventive method for detecting the level of the melt ME contained by the oscillating mold 3, in particular by the detector system 1 or its detector 10, respectively. The method comprises the steps: a) sensing the radiation IR interacted with the melt ME and generating from the sensed radiation IR the radiation signals RS, such that the generated radiation signals RS are varied by the mold oscillation MO, in particular by the radiation sensing and radiation signal generating device 15; b) determining the radiation signal variation RSV of the generated radiation signals RS, in particular by the radiation signal variation determining device 20; c) determining the oscillation deflection variation ODV of the oscillating mold 3, in particular by the oscillation deflection variation determining device 25; and d) determining from the determined oscillation deflection variation ODV and the determined radiation signal variation RSV, the level LE of the melt ME, in particular by the level determining device 30.

Moreover, the detector 10 is adapted to detect a thickness T of a casting powder PO on the melt ME contained by the oscillating mold 3. The level determining device 30 is adapted to determine from the determined oscillation deflection variation ODV and the determined radiation signal variation RSV the thickness T of the casting powder PO. In the shown embodiment the level determining device 30 determines from the determined oscillation deflection variation ODV and the determined radiation signal variation RSV the thickness T of the casting powder PO, as shown in FIG. 4.

Figure 4:
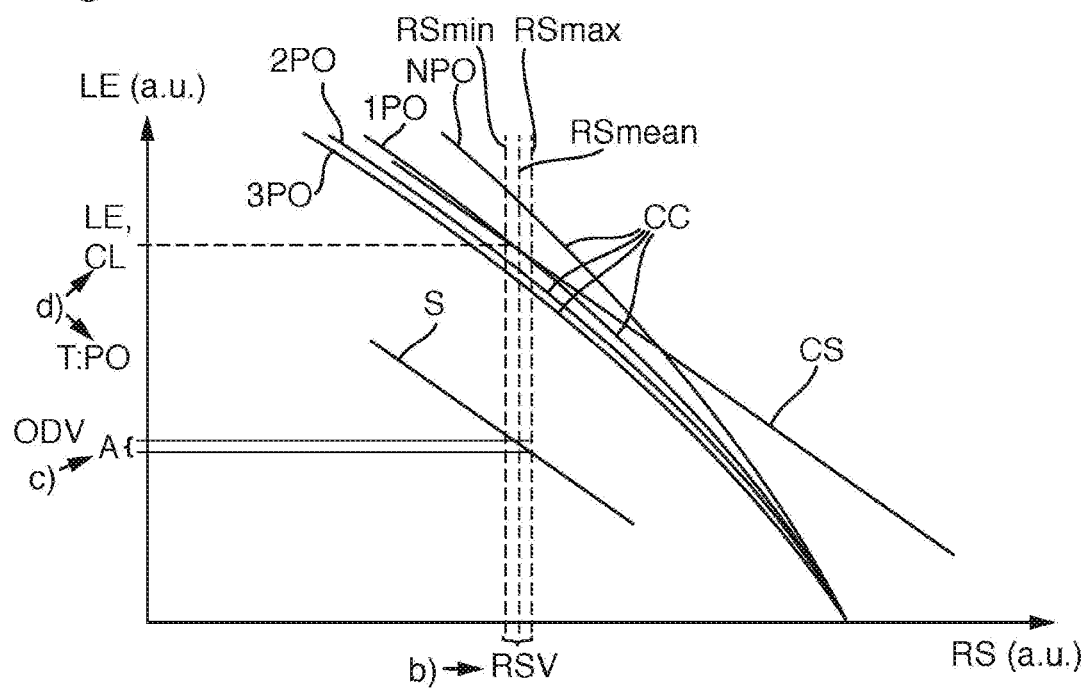
FIG. 4 schematically shows a diagram of calibration curves comprising calibration levels over radiation signals.

Further, FIGS. 1 and 4 show an inventive method for detecting the thickness T of the casting powder PO on the melt ME contained by the oscillating mold 3, in particular by the detector system 1 or its detector 10, respectively. The method comprises: the method as described above and the step of: determining from the determined oscillation deflection variation ODV and the determined radiation signal variation RSV the thickness T of the casting powder PO, in particular by the level determining device 30.

Furthermore, the oscillation deflection variation determining device 30 comprises an inertial sensor and/or an accelerometer. The inertial sensor and/or the accelerometer are/is adapted to determine the oscillation deflection variation ODV of the oscillating mold 3. In the shown embodiment the inertial sensor and/or the accelerometer determine/s the oscillation deflection variation ODV of the oscillating mold 3.

Moreover, the detector system 1 comprises the mold 3. The mold 3 is adapted to contain the melt ME. In particular in FIGS. 1 and 2 the mold 3 comprises an opening at a base end, in particular for exiting of the melt ME or a strand, respectively.

In detail the radiation sensing and radiation signal generating device 15 and the oscillation deflection variation determining device 25 are arranged with respect to the mold 3, in particular attached to the mold 3.

Further, the detector system 1 comprises an oscillating device 4. The oscillating device 4 is adapted to oscillate the mold 3, and in particular thereby the radiation signal generating device 15 and the oscillation deflection variation determining device 25. In the shown embodiment the oscillating device 4 oscillates the mold 3.

The method comprises the step of: oscillating the mold 3, in particular by the oscillating device 4.

In the shown embodiment the mold 3 is oscillated with a frequency fq of 5 Hz and an amplitude A of 5 mm, in particular peak-to-peak, as shown in FIG. 3.

In FIG. 1 the mold 3 is in a lower peak deflection, in particular at −A/2. In FIG. 2 the mold 3 is in an upper peak deflection, in particular at +A/2.

The, in particular determined, oscillation deflection variation ODV corresponds or is the amplitude A of the mold oscillation MO.

Furthermore, the mold 3 is oscillated along an, in particular vertical, oscillation direction z perpendicular to the level LE of the melt ME, such that the level LE of the melt ME is varied with respect to the mold 3, and in particular thereby to the radiation signal generating device 15 and the oscillation deflection variation determining device 25.

Moreover, the detector system 1 comprises a radiation source 2. The radiation source 2 is adapted to expose the melt ME to radiation RA, as shown by dashed lines in FIGS. 1 and 2, such that the radiation RA interacts with the melt ME, and in particular with the casting powder PO. In the shown embodiment the radiation source 2 exposes the melt ME to radiation RA and the radiation RA interacts with the melt ME, and in particular with the casting powder PO.

In detail the radiation source 2 is arranged with respect to the mold 3, in particular attached to the mold 3. In particular thereby the radiation source 2 is oscillated and is varied with respect to the level LE of the melt ME.

The method comprises the step of: exposing the melt ME to the radiation RA, such that the radiation RA interacts with the melt ME, and in particular with the casting powder PO, in particular by the radiation source 2.

In the shown embodiment the radiation source 2 is a gamma radiation source, in particular in form of a rod source, and the radiation IR, RA is gamma radiation.

In detail the radiation sensing and radiation signal generating device 15 comprises at least one scintillator and at least one photosensor, in particular for sensing the gamma radiation IR.

In particular the gamma radiation source 2 is arranged at one side of the mold 3 and the at least one scintillator and at least one photosensor 15 are arranged at another side of the mold 3.

The gamma radiation RA may be exposed along a, in particular horizontal, exposing direction x parallel to the level of the melt ME, in particular from the one side of the mold 3 by the gamma radiation source 2.

Further, in step a) the radiation IR is sensed along a, in particular horizontal, radiation direction x parallel to the level LE of the melt ME, in particular at the other side of the mold 3 by the at least one scintillator and the at least one photosensor 15.

Furthermore in step b) the radiation signal variation RSV is determined by frequency analysis of the generated radiation signals RS.

In detail the method comprises the step of: determining extreme radiation signals RSmin, RSmax of the generated radiation signals RS, as shown in FIG. 4, in particular by frequency analysis. In particular the extreme radiation signals RSmin, RSmax comprise a minimal radiation signal RSmin, in particular at +A/2, and a maximal radiation signal RSmax, in particular at −A/2. In alternative embodiments a mean radiation signal RSmean of the generated radiation signals RS may be determined, in particular by frequency analysis. In the shown embodiment the radiation signal variation RSV is determined as a difference of the extreme radiation signals RSmin, RSmax.

Moreover, step d) comprises: determining a slope S from the determined oscillation deflection variation ODV over the determined radiation signal variation RSV. Determining from the determined slope S the level LE of the melt ME, and in particular the thickness T of the casting powder PO.

In detail step d) comprises: selecting a calibration slope CS, which fits best the determined slope S, of at least one calibration curve CC. In the calibration curve CC different calibration levels CL are assigned to different calibration slopes CS. Selecting the calibration level CL, which is assigned to the selected calibration slope CS, as the level LE of the melt ME.

Further, in step d) the level LE of the melt ME, and in particular the thickness T of the casting powder PO, is determined from the determined radiation signal variation RSV at the determined extreme radiation signals RSmin, RSmax. In alternative embodiments the level of the melt, and in particular the thickness of the casting powder, may be determined from the determined radiation signal variation at the determined mean radiation signal.

In the shown embodiment several calibration curves CC with the calibration slope CS, which fits best the determined slope S, are present, but with the best fitting calibration slope CS, respectively, at different extreme radiation signals and/or at different mean radiation signals. In other words: in the calibration curves CC, respectively, at different extreme radiation signals and/or at different mean radiation signals, respectively, different calibration levels are assigned to different calibration slopes. In particular to the calibration curves CC different calibration thicknesses of the casting powder PO are assigned, in particular zero thickness NPO, thickness 1PO or 10 mm, respectively, double thickness 2PO or 20 mm, respectively, triple thickness 3PO or 30 mm, respectively.

In the shown embodiment step d) comprises: selecting at the determined extreme radiation signals RSmin, RSmax the calibration slope CS, which fits best the determined slope S, of the several calibration curves CC. Formulated differently: step d) comprises: selecting the calibration level CL, which is assigned to the selected calibration slope CS of the selected calibration curve CC, as the level LE of the melt ME.

Furthermore, the step determining the thickness T of the casting powder PO comprises: selecting the calibration thickness 1PO, which is assigned to the selected calibration curve CC, as the thickness T of the casting powder PO.

In the shown embodiment the selected calibration thickness is 1PO.

In particular the sensing and the generating of a, in particular single, radiation signal RS may be represented as a vertical line in FIG. 4, for example at RSmean. For this single radiation signal RS several calibration levels, and in particular several calibration thicknesses, are possible or applicable, in particular due to the presence of the several calibration curves CC. However, each sensing and generating of a radiation signal RS, in particular every 5 ms, may be represented as a new vertical line in FIG. 4. Thereby, the radiation signal variation RSV, in particular at the extreme radiation signals RSmin, RSmax and/or at the mean radiation signal RSmean, can be determined. For this radiation signal variation RSV, in particular in combination with the oscillation deflection variation ODV, only the calibration level CL, and in particular only the calibration thickness 1PO, is possible or applicable.

As the shown and above discussed embodiments reveal, the invention provides a method for detecting a level of a melt contained by an oscillating mold in an improved manner than in the prior art. Furthermore, the invention provides a method for detecting a thickness of a casting powder on a melt contained by an oscillating mold comprising such a method, a detector for detecting a level of a melt contained by an oscillating mold and a detector system comprising such a detector.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for detecting a level of a melt contained by an oscillating mold, wherein the method comprises the steps of:
   a) sensing radiation interacted with the melt and generating radiation signals from the sensed radiation, such that the generated radiation signals are varied by the mold oscillation;
   b) determining a radiation signal variation of the generated radiation signals;
   c) determining, using an inertial sensor and/or an accelerometer, an oscillation deflection variation of the oscillating mold; and
   d) determining, from the determined oscillation deflection variation and the determined radiation signal variation, the level of the melt.

2. The method according to claim 1, wherein
   the mold is oscillated along an oscillation direction perpendicular to the level of the melt, such that the level is varied with respect to the mold.

3. The method according to claim 1, wherein the method further comprises the step of:
   oscillating the mold.

4. The method according to claim 1, wherein the method further comprises the step of:
   exposing the melt to radiation, such that the radiation interacts with the melt.

5. The method according to claim 1, wherein
   the radiation is gamma radiation.

6. The method according to claim 1, wherein
   in step a), the radiation is sensed along a radiation direction parallel to the level of the melt.

7. A method for detecting a level of a melt contained by an oscillating mold, wherein the method comprises the steps of:
   a) sensing radiation interacted with the melt and generating radiation signals from the sensed radiation, such that the generated radiation signals are varied by the mold oscillation;
   b) determining a radiation signal variation of the generated radiation signals;
   c) determining an oscillation deflection variation of the oscillating mold; and
   d) determining, from the determined oscillation deflection variation and the determined radiation signal variation, the level of the melt,
   wherein
      the mold is oscillated with a frequency, and
      in step b), the radiation signal variation is determined by frequency analysis of the generated radiation signals.

8. A method for detecting a level of a melt contained by an oscillating mold, wherein the method comprises the steps of:
   a) sensing radiation interacted with the melt and generating radiation signals from the sensed radiation, such that the generated radiation signals are varied by the mold oscillation;
   b) determining a radiation signal variation of the generated radiation signals;
   c) determining an oscillation deflection variation of the oscillating mold; and
   d) determining, from the determined oscillation deflection variation and the determined radiation signal variation, the level of the melt,
   wherein step d) further comprises:
      determining a slope from the determined oscillation deflection variation over the determined radiation signal variation and determining from the determined slope the level of the melt.

9. The method according to claim 8, wherein step d) further comprises:
   selecting a calibration slope, which fits best the determined slope, of at least one calibration curve, wherein in the calibration curve different calibration levels are assigned to different calibration slopes, and selecting the calibration level, which is assigned to the selected calibration slope, as the level of the melt.

10. A method for detecting a level of a melt contained by an oscillating mold, wherein the method comprises the steps of:
    a) sensing radiation interacted with the melt and generating radiation signals from the sensed radiation, such that the generated radiation signals are varied by the mold oscillation;
    b) determining a radiation signal variation of the generated radiation signals;
    c) determining an oscillation deflection variation of the oscillating mold; and
    d) determining, from the determined oscillation deflection variation and the determined radiation signal variation, the level of the melt,
    wherein the method further comprises the step of:
       determining extreme radiation signals and/or a mean radiation signal of the generated radiation signals, and
    in step d), the level of the melt is determined from the determined radiation signal variation at the determined extreme radiation signals and/or at the determined mean radiation signal.

11. A method for detecting a thickness of a casting powder on a melt contained by an oscillating mold, wherein the method comprises the steps of:
    a) sensing radiation interacted with the melt and generating radiation signals from the sensed radiation, such that the generated radiation signals are varied by the mold oscillation;
    b) determining a radiation signal variation of the generated radiation signals;

c) determining an oscillation deflection variation of the oscillating mold; and d) determining, from the determined oscillation deflection variation and the determined radiation signal variation, the level of the melt;

determining, from the determined oscillation deflection variation and the determined radiation signal variation, the thickness of the casting powder.

12. A detector for detecting a level of a melt contained by an oscillating mold, wherein the detector comprises:
a radiation sensing and radiation signal generating device, which is adapted to sense radiation interacted with the melt and to generate radiation signals from the sensed radiation, such that the generated radiation signals are varied by the mold oscillation;
a radiation signal variation determining device, which is adapted to determine a radiation signal variation of the generated radiation signals;
an oscillation deflection variation determining device, which is adapted to determine an oscillation deflection variation of the oscillating mold; and
a level determining device, which is adapted to:
determine from the determined oscillation deflection variation and the determined radiation signal variation, the level of the melt, and
to determine from the determined oscillation deflection variation and the determined radiation signal variation, the thickness of the casting powder.

13. A detector system, comprising:
a detector according to claim 12; and
a radiation source, wherein the radiation source is adapted to expose the melt to radiation, such that the radiation interacts with the melt.

14. A detector system, comprising:
a detector according to claim 12;
the mold, and/or
an oscillating device, which is adapted to oscillate the mold.

15. A detector for detecting a level of a melt contained by an oscillating mold, wherein the detector comprises:
a radiation sensing and radiation signal generating device, which is adapted to sense radiation interacted with the melt and to generate radiation signals from the sensed radiation, such that the generated radiation signals are varied by the mold oscillation;
a radiation signal variation determining device, which is adapted to determine a radiation signal variation of the generated radiation signals;
an oscillation deflection variation determining device, which is adapted to determine an oscillation deflection variation of the oscillating mold; and
a level determining device, which is adapted to determine from the determined oscillation deflection variation and the determined radiation signal variation, the level of the melt,
wherein
the oscillation deflection variation determining device comprises an inertial sensor and/or an accelerometer, which are/is adapted to determine the oscillation deflection variation of the oscillating mold.

16. A detector for detecting a level of a melt contained by an oscillating mold, wherein the detector comprises:
a radiation sensing and radiation signal generating device, which is adapted to sense radiation interacted with the melt and to generate radiation signals from the sensed radiation, such that the generated radiation signals are varied by the mold oscillation;
a radiation signal variation determining device, which is adapted to determine a radiation signal variation of the generated radiation signals;
an oscillation deflection variation determining device, which is adapted to determine an oscillation deflection variation of the oscillating mold; and
a level determining device, which is adapted to determine from the determined oscillation deflection variation and the determined radiation signal variation, the level of the melt, wherein
the mold is oscillated with a frequency, and
the radiation signal variation is determined by frequency analysis of the generated radiation signals.

17. A detector for detecting a level of a melt contained by an oscillating mold, wherein the detector comprises:
a radiation sensing and radiation signal generating device, which is adapted to sense radiation interacted with the melt and to generate radiation signals from the sensed radiation, such that the generated radiation signals are varied by the mold oscillation;
a radiation signal variation determining device, which is adapted to determine a radiation signal variation of the generated radiation signals;
an oscillation deflection variation determining device, which is adapted to determine an oscillation deflection variation of the oscillating mold; and
a level determining device, which is adapted to:
determine from the determined oscillation deflection variation and the determined radiation signal variation, the level of the melt,
determine a slope from the determined oscillation deflection variation over the determined radiation signal variation, and
determine from the determined slope the level of the melt.

18. A detector for detecting a level of a melt contained by an oscillating mold, wherein the detector comprises:
a radiation sensing and radiation signal generating device, which is adapted to sense radiation interacted with the melt and to generate radiation signals from the sensed radiation, such that the generated radiation signals are varied by the mold oscillation;
a radiation signal variation determining device, which is adapted to determine a radiation signal variation of the generated radiation signals;
an oscillation deflection variation determining device, which is adapted to determine an oscillation deflection variation of the oscillating mold; and
a level determining device, which is adapted to determine from the determined oscillation deflection variation and the determined radiation signal variation, the level of the melt, wherein
the radiation signal variation determining device is further adapted to determine extreme radiation signals and/or a mean radiation signal of the generated radiation signals, and
the level of the melt is determined from the determined radiation signal variation at the determined extreme radiation signals and/or at the determined mean radiation signal.

* * * * *